United States Patent
Babin et al.

Patent Number: 5,825,176
Date of Patent: Oct. 20, 1998

[54] SENSOR MOUNTED ADJACENT AN OUTER MEMBER FOR SENSING THE ROTATIONAL SPEED OF A INNER MEMBER

[75] Inventors: Brian G. Babin, Sterling Heights; Scott K. Engel, Novi, both of Mich.

[73] Assignee: SSI Technologies, Inc., Janesville, Wis.

[21] Appl. No.: 774,918

[22] Filed: Dec. 27, 1996

Related U.S. Application Data

[63] Continuation-in-part of Ser. No. 605,969, Feb. 23, 1996, abandoned, which is a continuation-in-part of Ser. No. 467,576, Jun. 6, 1995, abandoned.

[51] Int. Cl.$^6$ ............................ G01P 3/487; G01P 3/488; G01D 5/12
[52] U.S. Cl. ................. 324/174; 73/514.39; 324/207.15; 324/207.22; 477/34
[58] Field of Search ..................................... 324/160, 161, 324/163–166, 173–175, 207.15, 207.16, 207.2, 207.21, 207.22, 207.25; 73/862.325, 862.321, 861.351, 861.352, 861.353, 861.78, 514.39; 188/181 R; 123/414; 180/338, 170; 310/68 B, 155, 168; 340/441, 466, 671, 672; 384/448; 303/138; 477/34

[56] References Cited

U.S. PATENT DOCUMENTS

| | | | |
|---|---|---|---|
| 3,188,620 | 6/1965 | MacCallum | 324/174 X |
| 3,344,666 | 10/1967 | Rilett | 73/861.352 |
| 3,742,243 | 6/1973 | Gamble | 307/106 |
| 3,938,112 | 2/1976 | Gee | 340/195 |
| 3,980,913 | 9/1976 | Peterson | 310/155 |
| 4,029,180 | 6/1977 | Gee | 188/181 |
| 4,086,519 | 4/1978 | Persson | 318/254 |
| 4,112,683 | 9/1978 | Bess | 60/595 |
| 4,529,934 | 7/1985 | Heinrich | 324/173 |
| 4,562,399 | 12/1985 | Fisher | 322/94 |
| 4,646,088 | 2/1987 | Inoue | 340/870.31 |
| 4,700,133 | 10/1987 | Day | 324/208 |
| 4,721,864 | 1/1988 | Goosens | 324/174 X |
| 4,795,278 | 1/1989 | Hayashi | 384/448 |
| 4,810,967 | 3/1989 | Yokoyama et al. | 324/208 |
| 4,855,734 | 8/1989 | Elsdoerfer | 340/870.31 |
| 4,862,025 | 8/1989 | Dierker, Jr. et al. | 310/68 |
| 4,893,075 | 1/1990 | Dierker, Jr. | 324/174 |
| 4,924,180 | 5/1990 | Nasr et al. | 324/207.15 |
| 4,937,522 | 6/1990 | Gee | 324/174 |
| 5,004,358 | 4/1991 | Varvello et al. | 384/446 |
| 5,070,298 | 12/1991 | Honda et al. | 324/207.2 |
| 5,083,468 | 1/1992 | Dobler et al. | 73/862.33 |
| 5,115,195 | 5/1992 | Peterson et al. | 324/207.13 |
| 5,130,649 | 7/1992 | Kumagai | 324/174 |
| 5,191,284 | 3/1993 | Moretti et al. | 324/174 |
| 5,200,697 | 4/1993 | Adler et al. | 324/174 |
| 5,233,296 | 8/1993 | Maeda et al. | 324/207.22 |
| 5,251,600 | 10/1993 | Britsch . | |
| 5,264,790 | 11/1993 | Moretti et al. | 324/174 |
| 5,385,410 | 1/1995 | Shirai et al. | 384/446 |
| 5,444,369 | 8/1995 | Luetzow | 324/207.2 |
| 5,491,407 | 2/1996 | Maxson et al. | 324/174 |

FOREIGN PATENT DOCUMENTS

| | | | |
|---|---|---|---|
| 0 632 272 A2 | 4/1995 | European Pat. Off. | G01P 3/44 |
| 2590989 | 6/1987 | France | 324/174 |
| 2445866 | 4/1976 | Germany | 324/161 |
| 41 29 344 A1 | 11/1993 | Germany . | |
| 5296319 | 9/1993 | Japan | F16H 59/36 |

*Primary Examiner*—Gerard R. Strecker
*Attorney, Agent, or Firm*—Michael Best & Friedrich LLP

[57] ABSTRACT

An apparatus including an inner member mounted for rotation about an axis, an outer member mounted for concentric rotation about the inner member relative to the axis, the outer member having an inner surface adjacent the inner member and an outer surface, and a sensor mounted adjacent the outer surface of the outer member so as to measure the rotational speed of the inner member.

44 Claims, 5 Drawing Sheets

SENSOR MOUNTED ADJACENT AN OUTER MEMBER FOR SENSING THE ROTATIONAL SPEED OF A INNER MEMBER

RELATED APPLICATIONS

This is a continuation-in-part of application Ser. No. 08/605,969, filed Feb. 23, 1996, now abandoned which is a continuation-in-part of application Ser. No. 08/467,576, filed Jun. 6, 1995 and now abandoned.

BACKGROUND OF INVENTION

The invention relates to speed sensors and particularly to a speed sensor for detecting the rotational velocity of a rotating element. Speed sensors are used in many applications to detect the speed of a rotating element. In particular, they have been used in wheel end housing or bearing assemblies of vehicles to detect the speed of the rotating wheels supporting the vehicle. Additionally, speed sensors have been used in transmissions for automobiles and trucks to detect the rotational velocity of various rotating elements within the transmission. These transmissions are typically an extremely complex arrangement of gears and linkages that operate as part of the drive train of a vehicle to transmit power from the engine of the vehicle to the wheels of the vehicle. Transmissions often include a number of rotating cylindrical members concentrically mounted within one another for rotation about a common axis. The cylindrical members generally have formed therein one or more apertures that allow lubricating fluid to circulate through the transmission.

SUMMARY OF THE INVENTION

Because these rotating cylinders or members in the transmission are generally made of ferromagnetic materials, detecting the rotational speed of the inner cylinder using conventional variable reluctance speed sensors is difficult, if not impossible. This is because, when the apertures of the outer rotating cylinder are between the sensor and the inner rotating cylinder, the sensor does not generate a flux path having sufficient power to bridge the gap between the sensor and the inner member. Alternatively, when the material between the apertures of the outer cylinder is between the sensor and the inner cylinder, that material provides a short circuit to the magnetic flux path generated by the sensor and prevents the magnetic flux from reaching the inner rotating cylinder.

Accordingly, the invention provides in the transmission of an automobile, an inner rotating member or cylinder having a surface anomaly and an outer rotating member having an interior surface adjacent the inner member and having an exterior surface. The outer member includes a plurality of apertures extending between the interior surface and the exterior surface of the outer member. A speed sensor having a sensor head is mounted adjacent the exterior surface of the outer member so as to generate a flux path extending through at least one of the apertures in the outer member. The flux path extends to the inner member such that rotation of the inner member relative to the sensor generates a variation in the reluctance of the flux path.

In one form of the invention, viewing a plane perpendicular to the axis of rotation of the rotating members, the apertures in the outer member are evenly spaced about the member on opposite sides of the plane such that every other aperture is on the opposite side of the plane. The sensor head extends across the plane so that, as the outer member turns relative to the sensor, at least one aperture of the outer member is always exposed to the sensor. Thus, the flux path from the sensor to the inner member is never completely shorted by the outer member.

In another form of the invention, the apertures in the outer member are evenly spaced about the member and are aligned with the plane perpendicular to the axis of rotation of the rotating members. The sensor head is rotated 90 degrees from the sensor head described above so that the pole pieces of the sensor head are aligned with the plane. The pole pieces are spaced apart from each other a predetermined distance so that one of the pole pieces is always exposed to the inner member through one of the apertures in the outer member.

The inner member includes an exterior surface and a surface anomaly on the exterior surface. The anomaly may be a change in the physical structure of the exterior surface or may be a change in the material composition of the exterior surface of the inner member. Any change or anomaly is suitable as long as it produces a change in the reluctance of the exterior surface to an applied magnetic flux. In one form of the invention, the anomaly includes a tone ring having a plurality of radially extending teeth evenly spaced about the exterior surface of the inner member. As the inner member rotates relative to the speed sensor, the passage of the teeth on the inner member past the sensor generates a high frequency, small scale change in the reluctance of the member cylinder to the flux path. The frequency of this change in reluctance is directly related to the rotational speed of the inner cylinder and the reluctance change results in a high frequency, low amplitude variation in the electrical output signal of the sensor. In another form, a magnetic tone wheel having regions of alternating polarity as mounted on the inner member. As the inner member rotates past the sensor, the alternating polarity of the magnetic regions creates an alternating flux field around the sensor that generates a high frequency, low amplitude variation in the output of the sensor.

As the outer member rotates relative to the speed sensor, the passage of the spaced apertures past the speed sensor generates a low frequency, large scale change in the reluctance of the outer member to the flux path. The frequency of this change in reluctance is directly related to the rotational speed of the outer member, and the low frequency change in the reluctance generates a low frequency, high amplitude variation in the electrical output signal of the speed sensor. The high frequency, low amplitude output variation and the low frequency, high amplitude output variation form separate and divisible components of the electrical output signal generated by the sensor. Using electronic signal conditioning circuitry, the output signal of the sensor can be electronically manipulated to separate the electrical components of the output signal and thereby allow detection of the rotational speed of the inner rotating member and the rotational speed of the outer rotating member.

A principal advantage of the invention is the provision of a transmission having a speed sensor capable of detecting the rotational speed of an inner member rotating inside a rotating outer member.

Another advantage of the invention is the provision of a transmission requiring only a single sensor for detecting the rotational speed of both the inner rotating member and the outer rotating member.

Other features and advantages of the invention are set forth in the following detailed description and claims.

BRIEF DESCRIPTION OF THE DRAWINGS

FIG. 7 is a partial schematic view of components shown in FIG. 2 and showing the sensor adjacent the outer surface of the outer rotating member of the transmission.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarding as limiting.

DESCRIPTION OF THE PREFERRED EMBODIMENT

Figure 1:
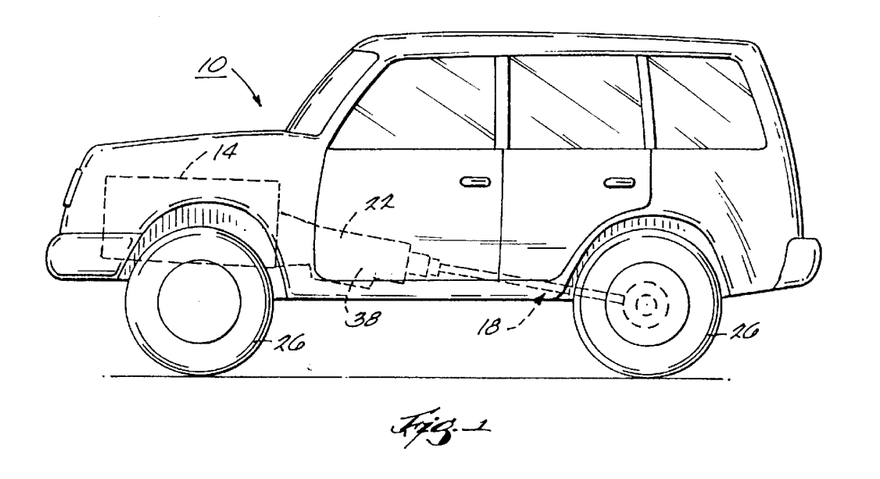
FIG. 1 is a side-elevational view of a vehicle, illustrating in phantom the drive train of the vehicle.

Shown in FIG. 1 of the drawings is a vehicle 10. While the vehicle 10 shown is an automobile, the vehicle may be an automobile, truck, train, golf cart, or any other vehicle that employs a power plant or engine and a drive train having rotating elements connected to the engine. FIG. 1 illustrates an engine 14 and a portion of drive train 18 of the vehicle 10. The drive train 18 includes a transmission 22 for transmitting power from the engine 14 of the vehicle 10 to the wheels 26 to propel the vehicle 10 along the surface on which the vehicle 10 is supported.

While the invention is shown and described in terms of its application in the transmission 22 of a vehicle 10, it should be understood that the invention could be employed in any application or construction where it is desirable to measure the rotational speed of one rotating element that is rotating within another rotating element.

Figure 2:
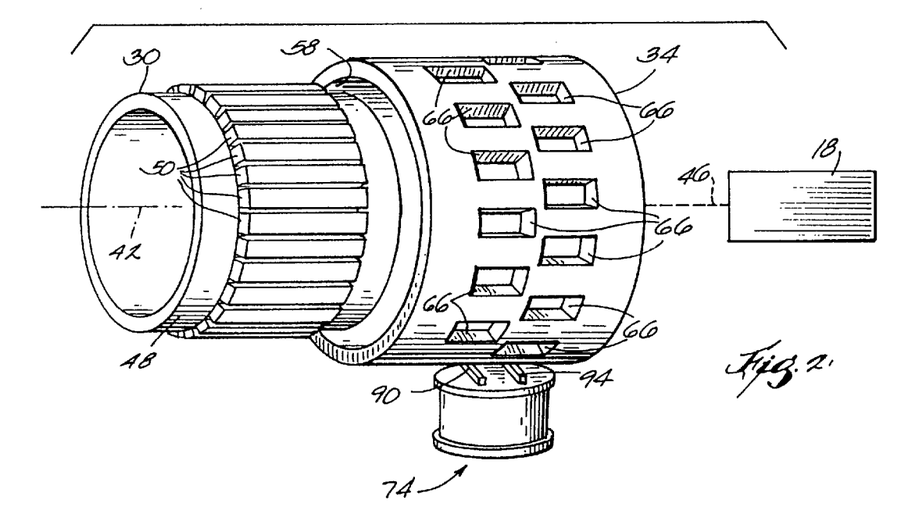
FIG. 2 is a partial exploded perspective view of a portion of one embodiment of the transmission incorporated in the drive train of the vehicle shown in FIG. 1.

As shown in FIG. 2 the transmission 22 includes an inner rotating member, drum, or cylinder 30 and an outer rotating member, drum or cylinder 34. The inner member 30 and the outer member 34 are shown in exploded relation with the inner member 30 offset from its normal operating position within the outer member 34. The members 30 and 34 are supported by a housing 38 shown in FIG. 1 only. The inner member 30 is mounted within the transmission 22 for rotation about an axis 42. The inner member 30 is connected to the drive train 18 of the vehicle 10 via a linkage 46 (shown schematically in FIG. 2). While the inner member 30 can be made of any suitable material, in the embodiment shown in FIG. 2, the inner member 30 is a generally cylindrical aluminum drum. The inner member 30 has an outer surface 48. The outer surface 48 includes a plurality of surface anomalies or variations 50 that are evenly spaced around the circumference of the outer surface 48. While any surface variations that exhibit a change in the reluctance of the inner member 30 to flux are acceptable, in the embodiment shown in FIG. 2, the surface variations 50 are a plurality of radially extending teeth formed on a tone wheel 54 which is press fitted onto the rotating aluminum inner member 30.

The outer member 34 is also supported by the housing 38 for rotation about the axis 42. The outer member 34 surrounds the inner member 30, that is, is concentric to the inner member 30 and is connected to the drive train 18 via the linkage 46. While the outer member 34 can be made of any suitable ferromagnetic material, the outer member 34 shown in FIG. 2 is made of low carbon steel. The outer member 34 includes an inner surface 58 facing the outer surface 48 of the inner member 30, an outer surface 62, and a plurality of apertures 66 extending between the inner surface 58 and the outer surface 62. The outer member 34 is generally cylindrical and the apertures 66 are evenly spaced about the circumference of the outer member 34 such that every other one of the apertures 66 is on one side of a plane 70 (shown as a line 70 in FIGS. 3–6) that is transverse to the axis 42 of rotation and so that the other of the apertures 66 are on the opposite side of the plane 70. Stated alternatively, the apertures 66 form two rows of circumferentially spaced apart rectangular apertures, the rows being longitudinally spaced and on opposite sides of plane 70. When the inner member 30 is positioned within the outer member 34, the teeth 50 extend across the plane 70 so that they span both rows of apertures 66 in outer member 34.

As shown in FIGS. 3–7, the transmission 22 further includes a sensor 74 mounted on the housing 38 adjacent the outer surface 62 of the outer member 34. The sensor 74 is a variable reluctance speed sensor. The sensor 74 includes a magnet 78 having magnetically opposite poles 82 and 86 (or N and S in FIG. 7) and includes pole pieces 90 and 94 mounted on the poles, respectively. As shown in FIG. 7, the sensor 74 also includes an inductive coil 98 that is wound around a generally plastic bobbin 102. The coil 98 and bobbin 102 surround the magnet 78 and pole pieces 90 and 94 so that the magnetic flux generated by the magnet 78 generates a corresponding electrical current signal in the coil 98. The coil 98 includes a pair of leadwires (not shown) that are connected to a signal conditioning circuit (not shown) for processing the electrical signal generated by the magnetic flux.

In operation, as the inner member 30 rotates, the surface anomalies or teeth 50 rotate past the speed sensor 74 causing a high frequency, small scale variation in the reluctance of the inner member 30 to flux. The variation in reluctance to flux generates a high frequency, low amplitude variation in the electrical signal generated on the coil 98 of the sensor 74.

The frequency of the signal is directly related to the rotational speed of the inner member 30.

Likewise, as the outer member 34 rotates relative to the speed sensor 74, the passage of the spaced apertures 66 past the speed sensor 74 generates a low frequency, large scale variation in the reluctance of the outer member 34 to flux which, in turn, causes a low frequency, high amplitude change in the electrical output signal of the speed sensor 74. The high frequency, low amplitude output variation and the low frequency, high amplitude output variation form separate and divisible components of the electrical output signal generated by the sensor 74. The output signal of the sensor 74 can be electronically manipulated using electronic signal conditioning circuitry to separate the individual components of the electrical output signal and thereby allow detection of the rotational speed of both the inner member 30 and the outer member 34.

While this invention can theoretically function effectively using any number apertures 66 in the outer member 34 and any number of teeth 50 on the inner member 30, it has been found desirable to optimize the number of teeth 50 and the number of apertures 66. Specifically, if the rotational speed limits of the inner member 30 and the outer member 34 are known, then the number of teeth 50 on the inner member 30 and the number of apertures 66 in the outer member 34 can be selectively chosen to optimize the frequency of the signal generated by the inner member 30 and the frequency of the signal generated by the outer member 34. Optimization of the frequencies of the electrical signal variations generated by the respective members allows one to use standard filtering practices to separate the signals from the composite output signal generated by the sensor 74. Such standard filtering practices can usually be employed using filtering circuitry that is either conventional or that is easily designed by one of skill in the art.

By way of example, assume that:

$Z_o$ = No. of teeth in outer member 34;

= $\frac{\text{No. of apertures 66}}{2}$ ;

$Z_i$ = No. of teeth 50 on inner member 30;

$V_o$ = Velocity of outer member 34 (Assume that 0 r.p.m. $\leq |V_o| \leq |V_i|$, (Note: velocity is independent of direction));

$V_i$ = velocity of inner member 30 (Assume that $|V_i| > O$ r.p.m. (Note: velocity is independent of direction));

$f_o$ = frequency of the signal generated by the outer member 34;

$$f_o = \frac{V_o \times Z_o}{60} \text{ (Hz)};$$

$f_i$ = frequency of the signal generated by the inner member 30; and $$f_i = \frac{V_i \times Z_i}{60} \text{ (Hz)}.$$

While it is desirable that $f_{imin}$ be greater than $f_{omax}$ by an order of magnitude, if, at a minimum $f_{omax} \leq f_{imin}$, then the signals of interest can be separated using either a high pass or a low pass filter. Separation of the frequencies by an order of magnitude allows the use of less complicated filtering methods.

Figures 3, 4:
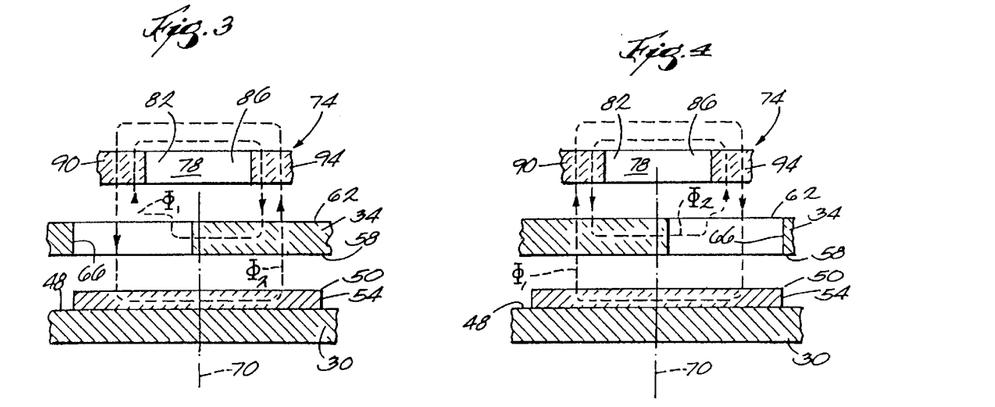
FIG. 3 is a partial schematic representation of a portion of the transmission of FIG. 2 showing the rotating members of the transmission in a first position.
FIG. 4 is a view similar to FIG. 3 and showing the rotating members of the transmission in a second position.

Shown in FIGS. 3–6 of the drawing are schematic representations of the flux paths $\Phi_1$ and $\Phi_2$ that are followed by the magnetic flux that is generated by the magnet 78 for the various positions of the inner member 30 and outer member 34. FIG. 3 shows one of the teeth 50 of the inner member 30 aligned with the sensor 74 and an aperture 66 in the outer member 34 located on the left side (as shown in FIG. 3) of the plane 70 orientated or aligned with the sensor 74. In this state, flux generated by the magnet 78 will flow (as shown by the representation of flux path $\Phi_1$) from the pole piece 94 through the material comprising the outer member 34 on the right side of the plane 70 and back to the pole piece 90 of the sensor 74. Also, magnetic flux generated by the magnet 78 will flow (as shown by the representation of flux path $\Phi_2$) from the pole piece 90 through the aperture 66 in the outer member 34 to the tooth 50 mounted on the inner member 30 and through the tooth 50, back through the portion of the outer member 34 to the right of the plane 70 and through the opposite pole piece 94 to complete the flux path $\Phi_2$.

FIG. 4 illustrates an operating condition wherein, as in FIG. 3, a tooth 50 on the inner member 30 is aligned with the sensor 74. However, in FIG. 4, the outer member 34 is positioned so that one of the apertures 66 to the right (as shown in FIG. 4) of the plane 70 is aligned with the sensor 74. In this operating state, the flux path $\Phi_1$ now extends from the pole piece 94 through the aperture 66 to the ferromagnetic tooth 50 on the inner member 30, through the portion of the outer member 34 opposite to the aperture 66, and to the pole piece 90. Alternatively, the flux path $\Phi_2$ now extends from the pole piece 90 to the portion of the outer member 34 opposite the aperture 66, and across the aperture 66 to the pole piece 94 to complete the flux path $\Phi_2$.

Figure 5:
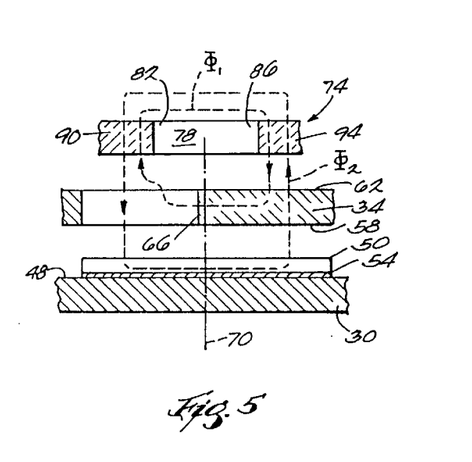
FIG. 5 is a view similar to FIG. 3 and showing the rotating members of the transmission in a third position.

FIG. 5 illustrates the operating state wherein the inner member 30 is aligned so that any flux path $\Phi_1$ or $\Phi_2$ generated by the sensor 74 is between successive teeth 50 on the inner member 30 and wherein an aperture 66 to the left (viewing FIG. 5) of the plane 70 is aligned with the sensor 74. In this state, the flux path $\Phi$ is the same as the flux path $\Phi_I$ in FIG. 3. Also, the flux path $\Phi_2$ is the same as the flux path $\Phi_2$ in FIG. 3 except that the reluctance of the inner member 30 to flux is varied because, rather than being aligned with a tooth 50 on the inner member 30, the sensor 74 is now aligned with the gap between successive teeth 50 on the inner member 30. This change in the reluctance to flux causes a corresponding change in the output signal generated on the coil 98 of the sensor 74.

Figure 6:
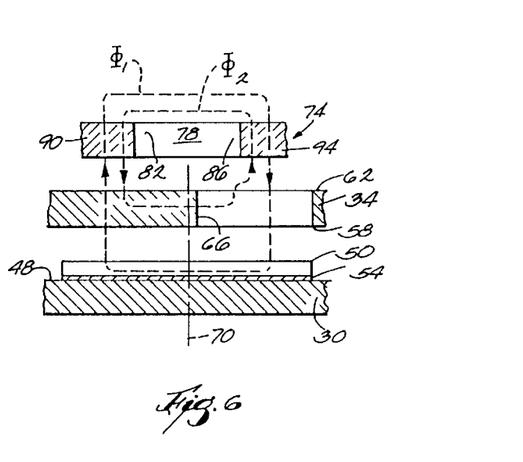
FIG. 6 is a view similar to FIG. 3 and showing the rotating members of the transmission in a fourth position.

FIG. 6 illustrates an operating state similar to that of FIG. 4 except that, as in FIG. 5, the sensor 74 is between successive teeth 50 on the inner member 30. Therefore, the flux pathways $\Phi_1$ and $\Phi_2$ are the same as those shown in FIG. 4 with the exception that the gap between the successive teeth 50 in the inner member 30 causes a change in the reluctance of the inner member 30 to flux and therefore a corresponding change in the electrical signal generated on the coil 98 as a result of the flux path $\Phi_1$. It should be noted that in all of the above cases the flux direction is a matter of convention and can be changed in various ways without changing the operation of the sensor 74 itself.

In a four speed transmission, the transmission 22 typically has three operating states that generate the four different transmission speeds. The inner member and the outer member rotate independantly of one another. In first gear, the outer member 34 rotates in a direction opposite to that of the inner member 30 and at a speed which is less than or equal to the speed of the inner member 30. In this state, the sensor 74 will generate an output signal on the coil 98 that reflects the changing flux path between the sensor 74 and the outer member 34 as well as the changing flux path between the sensor 74 and the inner member 30.

In second gear, the outer member 34 does not rotate, that is, it is stopped, while the inner member 30 continues to rotate. In this state, the sensor 74 will generate an output on the coil 98 that is a reflection of the magnetic flux that is between the sensor 74 and the inner member 30. As the inner member 30 rotates, the movement of the teeth 50 past the sensor 74 changes the reluctance of the inner member 30 to flux and therefore alters the electrical signal generated on the coil 98 of the sensor 74. As discussed above, these changes in the electrical signal are indicative of the rotating speed of the inner member 30.

In third gear, the outer member 34 is rotating at the same speed and in the same direction as the inner member 30. In this state, the reluctance to flux is changing for both flux paths, i.e., the flux path extending from the sensor 74 to the outer member 34 as well as the flux path extending from the sensor 74 to the inner member 30. Therefore, the sensor 74 will generate an electrical output that is a reflection of the rotational speed of both the outer member 34 and the inner member 30.

In fourth gear, the outer member 34 is again stopped while the inner member 30 continues to rotate and the output of the sensor 74 is similar to that of the output generated when the transmission 22 is in second gear.

By inputting the output of the coil 98 to an appropriate signal conditioning circuit (which may include a microprocessor based circuit for analyzing the signal), the rotational speed of the outer member 34 and the rotational speed of the inner member 30 can be detected and the operating state of the transmission can be determined. This information can be used to control various engine functions including electronic shifting of the transmission.

Figure 8:
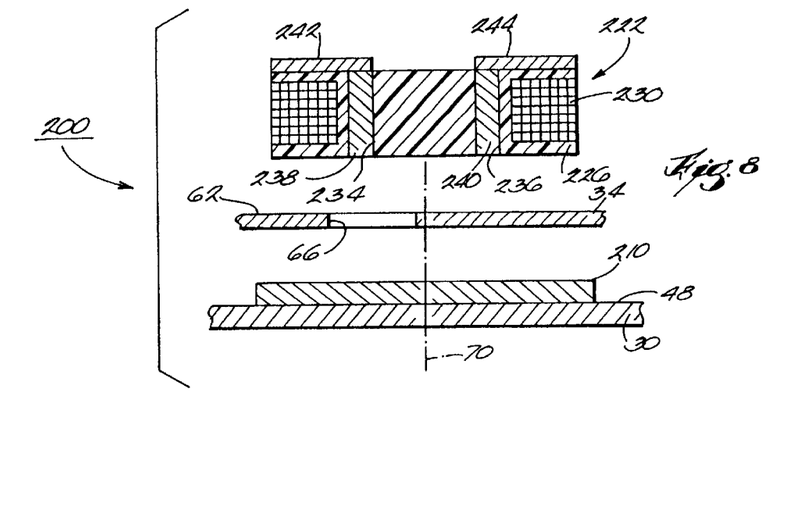
FIG. 8 is a view similar to FIG. 7 illustrating another embodiment of the transmission, which embodiment includes a magnetic tone wheel.
Figure 9:
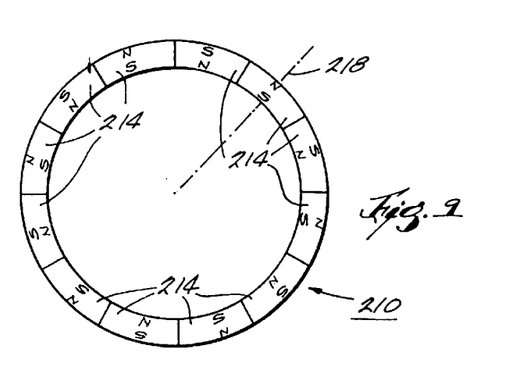
FIG. 9 is an end view of the magnetic tone wheel of FIG. 8 showing the polar orientation of the magnetic regions on the magnetic tone wheel.

FIG. 8 illustrates a transmission 200 that is another embodiment of the invention. Like parts are identified with like reference numerals. The transmission 200 includes a magnetic tone wheel 210 that is mounted (using any appropriate means) on the outer surface 48 of the inner member 30. The tone wheel 210 has formed therein a plurality of permanent magnetic regions 214 (shown only in FIG. 9) consecutively spaced about the circumference of the tone wheel 210. Each magnetic region 214 includes a magnetic pole pair having a north pole ("N") and a magnetically opposite south pole ("S"). The pole pairs alternate in polarity about the circumference of the tone wheel 210 and define a plurality of axes 218 (only one of which is shown in FIG. 9) extending between the north and south poles of the respective pole pairs. The axes 218 are perpendicular to the axis 42, i.e., the axes 218 extend radially outward from the axis 42.

The transmission 200 includes a sensor 222 (FIG. 8) supported by the transmission 200 adjacent the outer surface 62 of outer member 34. The sensor 222 includes a bobbin 226 and an inductive coil 230 wound onto the bobbin 226. The bobbin defines a pair of apertures 234 and 236 central to the coil 230 and the sensor 222 has a pair of ferromagnetic pole pieces 238 and 240 supported by the bobbin 226 in the apertures 234 and 236. The sensor 222 is positioned so that the pole pieces 238 and 240 are on opposite sides of the plane 70 (FIGS. 11–14). An optional pair of magnet caps 242 and 244 are shown mounted on the bobbin 226. The magnet caps 242 and 244 enhance the electrical signal generated on the coil 230.

In operation, as the inner member 30 rotates, the magnetic regions 214 rotate past the speed sensor 222. The alternating polarities of the magnetic regions 214 on the inner member 30 generate a series of flux fields having alternating flux path directions and the flux in these fields passes through the region surrounding the sensor 222 and through the sensor 222. In other words, the direction of flux flow in the flux path surrounding the sensor 222 changes in response to the alternating polarities of magnetic regions 214 that are aligned with the sensor 222. The alternating change in the flux field generates a high frequency, small scale variation in the electrical output of the sensor coil 230.

As the outer member 34 rotates relative to the speed sensor 222, the passage of the spaced apertures 66 through the flux field generates a low frequency variation in the reluctance of the outer member to flux. This variation in turn generates a low frequency change in the electrical output of the sensor coil 230. The output signal of the sensor is amplitude modulated only and therefore, the frequency optimization as described above with respect to the embodiment shown in FIG. 2 is not required.

Figure 10:
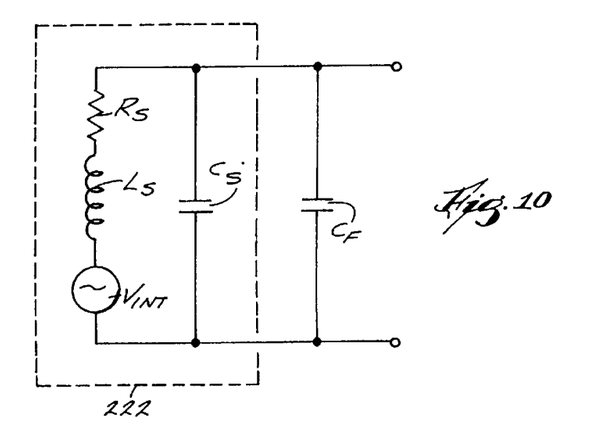
FIG. 10 is an electronic schematic view of the sensor shown in FIG. 8 showing an electronic filter connected thereto.

Though any type of known electronic filters can be employed depending upon the application and other design criteria, FIG. 10 illustrates a schematic view of the sensor 222 and one form of a very simple electronic filter connected thereto. The filter is a capacitor $C_F$ connected in parallel to the sensor 222, and $R_S$ is the internal resistance of the sensor 222, $L_S$ is the inductance of the sensor 222, $V_{INT}$ is the internal voltage generated by the flux field surrounding the sensor 222, and $C_S$ is the capacitance of the sensor 222.

Figure 11:
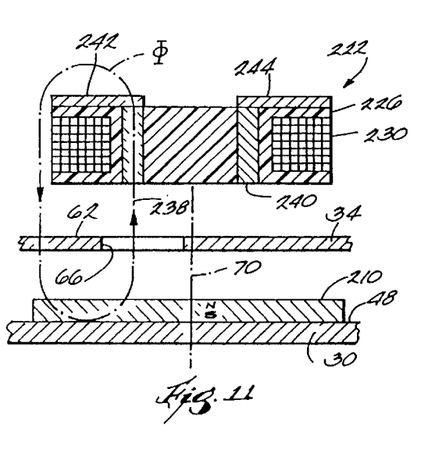
FIG. 11 is a partial schematic representation of a portion of the transmission of FIG. 8 showing the rotating members of the transmission in a first position.

Shown in FIGS. 11–14 of the drawings are schematic representations of the flux path $\Phi$ that is followed by the flux generated by magnetic regions 214 for the various positions of inner member 30 and outer member 34 relative to the sensor 222. FIG. 11 illustrates an operating condition wherein the inner member 30 is positioned so that a magnetic region 214 having an N-pole faces the sensor 222 and an aperture 66 is located on the left side (as shown in FIG. 11) of the plane 70 oriented or aligned with the sensor 222. In this state, flux generated by the tone wheel 210 will flow (as shown by the representation of flux path $\Phi$) in a counter-clockwise direction (as shown in FIG. 11) from tone wheel 210, through aperture 66 to pole piece 238, around coil 230, through outer member 34 and back to tone wheel 210 to complete the flux path $\Phi$.

Figure 12:
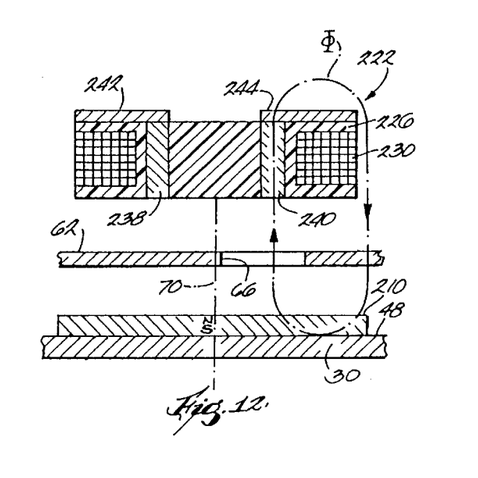
FIG. 12 is a view similar to FIG. 11 and showing the rotating members of the transmission in a second position.

FIG. 12 illustrates an operating condition wherein, as in FIG. 11, a magnetic region 214 having an N-pole is aligned with the sensor 222. However, in FIG. 12, the outer member 34 is positioned so that one of the apertures 66 to the right (as shown in FIG. 12) of the plane 70 is aligned with the sensor 222. In this operating position, the flux path $\Phi$ now extends in a clockwise direction from tone wheel 210 through aperture 66, through pole piece 240, around coil 230, through a portion of outer member 34 and back to tone wheel 210 to complete the flux path $\Phi$.

Figure 13:
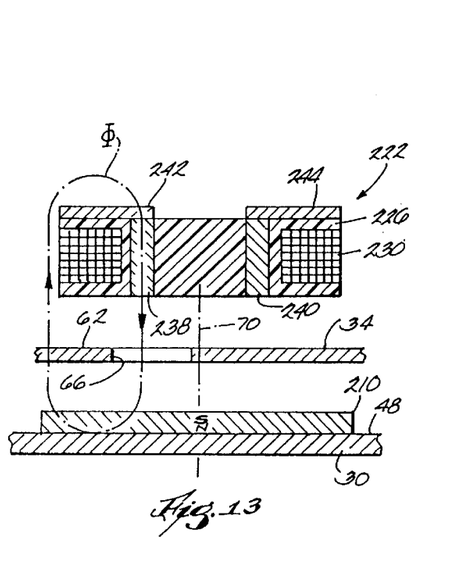
FIG. 13 is a view similar to FIG. 11 and showing the rotating members of the transmission in a third position.

FIG. 13 illustrates an operating condition wherein the inner member 30 is positioned so that a magnetic region 214 having a S-pole is aligned with the sensor 222 and wherein an aperture 66 to the left (viewing FIG. 13) of the plane 70 is aligned with the sensor 222. In this state, the flux path $\Phi$ is the same as the flux path $\Phi$ followed in the condition illustrated in FIG. 11 except that the flux path followed in FIG. 13 is clockwise rather than the counter-clockwise path followed in FIG. 11.

Figure 14:
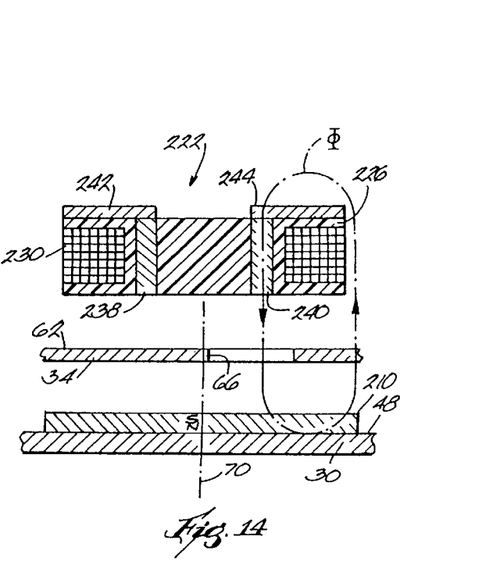
FIG. 14 is a view similar to FIG. 11 and showing the rotating members of the transmission in a fourth position.

FIG. 14 illustrates an operating condition similar to that of FIG. 12 except that, as in FIG. 13, the tone wheel 210 is aligned with the sensor 222 so that a magnetic region 214 having an S-pole is aligned with the sensor 222. In this state, the flux path $\Phi$ is the same as the flux path shown in FIG.

12 except that the flux path Φ in FIG. 14 is oriented in a counter-clockwise direction whereas the flux path shown in FIG. 12 is oriented in a counter-clockwise direction whereas the flux path shown in FIG. 12 is oriented in a clockwise direction.

Figure 15:
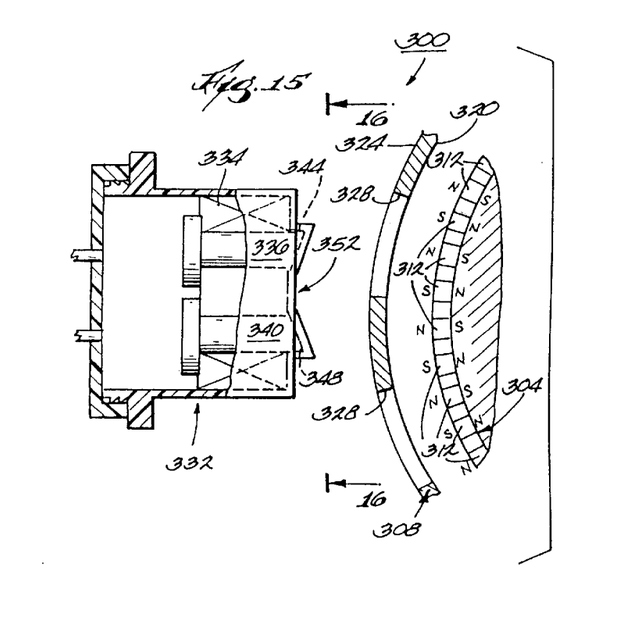
FIG. 15 is a partial end view of another embodiment of the transmission.
Figure 16:
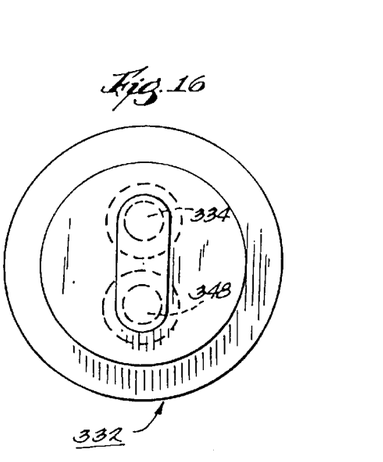
FIG. 16 is a view taken along line 16—16 in FIG. 15.

FIG. 15 illustrates a transmission 300 that is another embodiment of the invention. Like parts are identified using like reference numerals. The transmission 300 includes an inner member 304 and an outer rotating member 308. Like the rotating members 30 and 34, the rotating members 304 and 308 are supported within the transmission 300 for rotation about the axis 42 (shown only in FIG. 2). The inner rotating member 304 includes a plurality of magnetic regions 312 circumferentially spaced about the rotating member 304. The poles (N,S) of the magnetic regions 312 are radially aligned with respect to the axis 42 and the poles (N,S) of each successive magnetic region alternate in polarity. Each pair of successive magnetic regions is separated by a magnetically neutral, low magnetic permeability region 316. Though any low magnetic permeability material is appropriate, the regions illustrated in FIG. 15 are made of a material such as plastic. The provision of a magnetically neutral region 316 between each successive magnetic region 312 reduces the flux transmission from one pole (N or S) of a given magnetic region 312 from "shorting" to the opposite pole (S or N) of the magnetic region 312 next to the given magnetic region 312. Instead, the flux from one pole (N or S) of the given magnetic region 312 extends first radially outward and then "bends" around to return, through an associated magnetically neutral region 316, to the given magnetic region 312 at the opposite pole (S or N) of that given magnetic region 312.

The outer member 308 includes an inner surface 320, an outer surface 324, and a plurality of apertures 328 extending between the inner surface 320 and the outer surface 324. The outer member 308 differs from the outer member 34 in that there is only one row of apertures 328 and the apertures 328 are uniformly centered on the plane 70 (shown only in FIG. 7).

The transmission 300 also includes a sensor 332 for receiving the magnetic field that is generated by the magnetic regions 312 on rotating member 304, and that extends, at least in part, through the outer member 308 and the inner member 304. The sensor 332 is mounted adjacent the outer surface 324 of the outer member 308 and is substantially identical to the sensor 222. The sensor 332 includes a coil 334 and a pair of magnetically permeable pole pieces, 336 and 340, mounted adjacent the coil 334 and centered on the plane 70. As shown in FIG. 15, the pole pieces 336 and 340 include respective opposed, tapered end portions 344 and 348 slanting in a direction that is generally parallel to the outer surface 324 of the outer member 308. The end portions 344 and 348 form a surface 352 that is opposed to and generally complementary with the outer surface 324 of the outer member 308 so as to reduce the distance across which the magnetic field must be effective.

In operation, as the inner member 304 rotates, the magnetic regions 312 rotate past the speed sensor 332. The alternating polarities of the magnetic regions 312 on the inner member 304 generate a series of flux fields having alternating flux path directions and the flux in these fields passes through the region surrounding the sensor 332, as well as the sensor 332. In other words, the direction of flux flow in the flux path surrounding the sensor 332 changes in response to the alternating polarities of magnetic regions 312 that are aligned with the sensor 332. The alternating change in the magnetic field generates a high frequency, small scale variation in the electrical output of the sensor coil 334.

As the outer member 308 rotates relative to the speed sensor 332, the passage of the spaced apertures 328 through the magnetic field generates a low frequency variation in the reluctance of the outer member 308 to flux. This variation in turn generates a low frequency change in the electrical output of the sensor coil 334.

Various features and advantages of the invention are set forth in the following claims.

We claim:

1. An apparatus comprising:
   an inner member mounted for rotation about an axis;
   a cylindrical outer member mounted for concentric rotation about said inner member relative to said axis, such that rotation of said cylindrical outer member is independent of rotation of said inner member, said outer member having an inner surface adjacent said inner member and an outer surface; and
   a sensor mounted adjacent said outer surface of said cylindrical outer member, said outer cylindrical member being constructed so as to enable the sensor to measure the rotational speed of said inner member.

2. An apparatus as set forth in claim 1 wherein said cylindrical outer member includes a plurality of apertures extending between said inner surface of said cylindrical outer member and said outer surface of said cylindrical outer member.

3. An apparatus as set forth in claim 2 wherein said apertures are evenly spaced around the circumference of said cylindrical outer member such that every other one of said apertures is aligned with a plane perpendicular to said axis.

4. An apparatus as set forth in claim 3 wherein said sensor is positioned adjacent said outer surface of said cylindrical outer member and includes at least two pole pieces, said pole pieces lying within said plane and being spaced apart so that a one of said pole pieces is always exposed to said outer surface of said inner member through a one of said apertures.

5. An apparatus as set forth in claim 4 wherein each of said pole pieces includes a respective slanted end portion, said end portions forming a surface generally complementary to said outer surface of said cylindrical outer member.

6. An apparatus as set forth in claim 2 wherein said apertures are evenly spaced around the circumference of said cylindrical outer member such that every other one of said apertures is on the same side of a plane through said cylindrical outer member and perpendicular to said axis.

7. An apparatus as set forth in claim 6 wherein the other of said apertures are on the opposite side of the plane.

8. An apparatus as set forth in claim 7 wherein said speed sensor includes a magnet having a first pole on one side of the plane and a second pole magnetically opposite to said first pole on the other side of the plane.

9. An apparatus as set forth in claim 2 wherein said sensor includes a magnet having first and second magnetically opposite poles, said magnet generating a flux path having a predetermined reluctance and said flux path extending through at least one of said apertures in said cylindrical outer member such that rotation of said inner member relative to said sensor generates a first variation in said reluctance of said flux path.

10. An apparatus as set forth in claim 9 wherein rotation of said cylindrical outer member relative to said sensor generates a second variation in said reluctance of said flux path.

11. An apparatus as set forth in claim 10 wherein said first variation has a first predetermined frequency related to the rotational speed of said inner member and said second variation has a second predetermined frequency related to the rotational speed of said cylindrical outer member and wherein said first predetermined frequency is greater than said second predetermined frequency.

12. An apparatus as set forth in claim 1 wherein said inner member includes an outer generally cylindrical surface facing said inner surface of said cylindrical outer member, said outer surface of said inner member including a plurality of surface variations spaced about the circumference of said outer surface of said inner member.

13. An apparatus as set forth in claim 12 wherein said surface variations are radially extending teeth.

14. An apparatus as set forth in claim 1 wherein said inner member has a circumference and includes a plurality of magnetic regions that alternate in polarity around said circumference of said inner member so as to generate an alternating flux field extending toward said cylindrical outer member and said sensor.

15. An apparatus as set forth in claim 14 wherein said magnetic regions are formed on a magnetic tone wheel mounted on said inner member.

16. An apparatus as set forth in claim 15, wherein said inner member also includes a magnetically neutral, low magnetic permeability region separating consecutive ones of said magnetic regions that are formed on said magnetic tone wheel.

17. A transmission for a vehicle, the transmission comprising:
an inner member mounted for rotation about an axis;
a cylindrical outer member concentrically mounted, relative to said inner member, for rotation about said axis, such that rotation of said cylindrical outer member is independent of rotation of said inner member, said cylindrical outer member having an inner surface adjacent said inner member and an outer surface, and said cylindrical outer member including a plurality of apertures extending between said inner surface of said cylindrical outer member and said outer surface of said cylindrical outer member; and
a speed sensor mounted adjacent said outer surface of said cylindrical outer member so as to generate a flux path and a signal in response to said flux path, said flux path extending through at least one of said apertures on said cylindrical outer member to said inner member such that rotation of said inner member relative to said sensor generates a variation in said reluctance of said flux path.

18. A transmission as set forth in claim 17 wherein said apertures are evenly spaced around the circumference of said cylindrical outer member such that every other one of said apertures is aligned with a plane perpendicular to said axis.

19. A transmission as set forth in claim 18 wherein said sensor is positioned adjacent said outer surface of said cylindrical outer member and includes at least two pole pieces, said pole pieces lying within said plane and being spaced apart so that a one of said pole pieces is always exposed to said outer surface of said inner member through a one of said apertures.

20. A transmission as set forth in claim 19 wherein each of said pole pieces includes a respective slanted end portion, said end portions forming a surface generally complementary to said outer surface of said cylindrical outer member.

21. A transmission as set forth in claim 17 wherein said inner member includes an outer generally cylindrical surface facing said inner surface of said cylindrical outer member, said outer surface of said inner member including a plurality of surface variations spaced about the circumference of said outer surface of said inner member.

22. A transmission as set forth in claim 21 wherein said surface variations are radially extending teeth.

23. A transmission as set forth in claim 21 wherein said surface variations include a plurality of alternating polarity magnets mounted on said inner member.

24. A transmission as set forth in claim 23 wherein said magnets form a magnetic tone wheel mounted on said inner member and extending about the circumference on said outer surface of said inner member.

25. A transmission as set forth in claim 24, wherein said inner member also includes a magnetically neutral, low magnetic permeability region separating consecutive ones of said magnetic regions that are formed on said magnetic tone wheel.

26. A transmission as set forth in claim 17 wherein said apertures are evenly spaced around the circumference of said cylindrical outer member such that every other one of said apertures is on the same side of a plane perpendicular to said axis.

27. A transmission as set forth in claim 26 wherein the other of said apertures are on the opposite side of the plane.

28. A transmission as set forth in claim 27 wherein said speed sensor includes a magnet having a first pole on one side of the plane and a second pole magnetically opposite to said first pole on the other side of the plane.

29. A transmission as set forth in claim 17 wherein rotation of said cylindrical outer member relative to said sensor generates a variation in said reluctance of said flux path.

30. A transmission for a vehicle, the transmission comprising:
an inner cylinder mounted for rotation about an axis;
an outer cylinder concentrically mounted, relative to said inner cylinder, for rotation about said axis, said outer cylinder having an inner surface adjacent said inner cylinder and an outer surface, said outer cylinder including a plurality of apertures extending between said inner surface of said outer cylinder and said outer surface of said outer cylinder and being evenly spaced around the circumference of said outer cylinder such that every other one of said apertures is on the same side of a plane perpendicular to said axis and such that the other of said apertures are on the opposite side of the plane; and
a speed sensor mounted adjacent said outer surface of said outer cylinder and including a magnet having a first pole on one side of the plane and a second pole magnetically opposite to said first pole on the other side of the plane, said magnet generating a flux path having a predetermined reluctance and extending through at least one of said apertures in said outer cylinder to said inner cylinder such that rotation of said inner cylinder relative to said sensor generates a variation in said reluctance of said flux path, and such that rotation of said outer cylinder relative to said sensor generates a variation in said reluctance of said flux path.

31. A transmission as set forth in claim 30 wherein said inner cylinder includes an outer generally cylindrical surface facing said inner surface of said outer cylinder, said outer surface of said inner cylinder including a plurality of surface variations spaced about the circumference of said outer surface of said inner cylinder.

32. A transmission as set forth in claim 31 wherein said surface variations are radially extending teeth.

33. A vehicle comprising:

a drive train;

an engine; and a transmission for transmitting power from the engine to the drive train, said transmission including;

an inner cylinder mounted for rotation about an axis;

a ferromagnetic outer cylinder concentrically mounted, relative to said inner cylinder, for rotation about said axis, such that rotation of said outer cylinder is independent of rotation of said inner cylinder, said outer cylinder having an inner surface adjacent said inner cylinder and an outer surface, and said outer cylinder including a plurality of apertures extending between said inner surface of said outer cylinder and said outer surface of said outer cylinder; and a speed sensor mounted adjacent to and spaced from said outer surface of said outer cylinder so as to generate a flux path and a signal in response to said flux path, said flux path extending through at least one of said apertures on said outer cylinder such that rotation of said inner cylinder relative to said sensor generates a variation in said reluctance of said flux path.

34. A vehicle as set forth in claim 33 wherein said inner cylinder includes an outer generally cylindrical surface facing said inner surface of said outer cylinder, said outer surface of said inner cylinder including a plurality of surface variations spaced about the circumference of said outer surface of said inner cylinder.

35. A vehicle as set forth in claim 34 wherein said surface variations are radially extending teeth.

36. A transmission as set forth in claim 34 wherein said surface variations include a plurality of alternating polarity magnets mounted on said inner member.

37. A transmission as set forth in claim 36 wherein said magnets form a magnetic tone wheel mounted on said inner member and extending about the circumference on said outer surface of said inner member.

38. A transmission as set forth in claim 37, wherein said inner member also includes a magnetically neutral, low magnetic permeability region separating consecutive ones of said magnetic regions that are formed on said magnetic tone wheel.

39. A vehicle as set forth in claim 33 wherein said outer cylinder is generally cylindrical and said apertures are evenly spaced around the circumference of said outer cylinder such that every other one of said apertures is on the same side of a plane perpendicular to said axis.

40. A vehicle as set forth in claim 39 wherein the other of said apertures are on the opposite side of the plane.

41. A vehicle as set forth in claim 40 wherein said speed sensor includes a magnet having a first pole on one side of the plane and a second pole magnetically opposite to said first pole on the other side of the plane.

42. A vehicle as set forth in claim 33 wherein rotation of said outer cylinder relative to said sensor generates a variation in said reluctance of said flux path.

43. The apparatus of claim 1, wherein said cylindrical outer member includes at least one non-ferromagnetic region extending between said outer surface and said inner surface.

44. The apparatus of claim 43, wherein said at least one non-ferromagnetic region includes an aperture extending between said outer surface and said inner surface.

* * * * *